US009595888B2

United States Patent
Tao et al.

(10) Patent No.: US 9,595,888 B2
(45) Date of Patent: Mar. 14, 2017

(54) SYSTEM AND METHOD TO AVOID REVERSE RECOVERY IN A POWER CONVERTER

(71) Applicant: General Electric Company, Schenectady, NY (US)

(72) Inventors: Fengfeng Tao, Clifton Park, NY (US); Maja Harfman Todorovic, Niskayuna, NY (US); Luis Jose Garces, Niskayuna, NY (US); Rui Zhou, Niskayuna, NY (US); Donald Gene Marabell, Frisco, TX (US); Robert Louis Steigerwald, Burnt Hills, NY (US)

(73) Assignee: General Electric Company, Niskayuna, NY (US)

( * ) Notice: Subject to any disclaimer, the term of this patent is extended or adjusted under 35 U.S.C. 154(b) by 93 days.

(21) Appl. No.: 13/688,315

(22) Filed: Nov. 29, 2012

(65) Prior Publication Data

US 2014/0146585 A1   May 29, 2014

(51) Int. Cl.
| | |
|---|---|
| *H02M 7/48* | (2007.01) |
| *H02M 7/538* | (2007.01) |
| *H02M 7/5387* | (2007.01) |
| *H02J 3/38* | (2006.01) |

(52) U.S. Cl.
CPC ............ *H02M 7/538* (2013.01); *H02M 7/48* (2013.01); *H02M 7/5387* (2013.01); *H02J 3/383* (2013.01); *Y02E 10/563* (2013.01)

(58) Field of Classification Search
CPC .. H02M 3/33507; H02M 1/12; H02M 7/5395; H02M 7/49

USPC ........ 363/21.1, 39, 56.01, 56.02, 95, 97, 98, 363/131–132, 15–17, 40–41, 55
See application file for complete search history.

(56) References Cited

U.S. PATENT DOCUMENTS

| | | | |
|---|---|---|---|
| 4,310,866 A | | 1/1982 | Wirth |
| 4,628,426 A | * | 12/1986 | Steigerwald ................... 363/17 |
| 5,546,294 A | * | 8/1996 | Schutten ................. H02M 1/44 363/132 |
| 6,198,257 B1 | | 3/2001 | Belehradek et al. |
| 6,356,462 B1 | * | 3/2002 | Jang .................. H02M 3/33569 363/132 |
| 6,519,164 B1 | * | 2/2003 | Weng et al. ................. 363/21.04 |
| 6,650,551 B1 | * | 11/2003 | Melgarejo ............... H02M 1/34 363/16 |
| 2002/0117716 A1 | * | 8/2002 | Bosco ................. H02M 7/5387 257/341 |
| 2004/0213026 A1 | | 10/2004 | Park et al. |

(Continued)

OTHER PUBLICATIONS

Lin et al.; The high efficiency transformer-less PV inverter topologies derived from NPC topology; Power Electronics and Applications, 2009. EPE '09. 13th European Conference on ; Date of Conference: Sep. 8-10, 2009; 10 Pages.

*Primary Examiner* — Timothy J Dole
*Assistant Examiner* — Bryan R Perez
(74) *Attorney, Agent, or Firm* — Paul J. DiConza

(57) ABSTRACT

A power converter is provided. The power converter includes a converter leg including switches for converting power. The power converter also includes a controller for switching the switches using a pulse width modulation technique. The power converter further includes an interface inductor coupled to the converter leg for avoiding a reverse recovery of current in the switches during operation.

15 Claims, 6 Drawing Sheets

(56) References Cited

U.S. PATENT DOCUMENTS

| | | |
|---|---|---|
| 2005/0139259 A1 | 6/2005 | Steigerwald et al. |
| 2005/0248963 A1* | 11/2005 | Cheng ............... H02M 3/28 363/17 |
| 2005/0259451 A1* | 11/2005 | Mbaye .................... 363/40 |
| 2005/0286281 A1 | 12/2005 | Victor et al. |
| 2009/0034300 A1* | 2/2009 | Ito .................. H02M 1/4233 363/17 |
| 2009/0167097 A1 | 7/2009 | Seymour et al. |
| 2009/0168461 A1* | 7/2009 | Nakahori ........ H02M 3/33561 363/17 |
| 2009/0231884 A1* | 9/2009 | Bong ............. H02M 3/33576 363/17 |
| 2009/0273952 A1* | 11/2009 | Rozman et al. ............ 363/41 |
| 2009/0296434 A1 | 12/2009 | De Rooij et al. |
| 2009/0316458 A1 | 12/2009 | Gonzalez Senosiain et al. |
| 2010/0246223 A1 | 9/2010 | Xuan |
| 2011/0211379 A1* | 9/2011 | Chapman ......... H02M 7/53873 363/131 |
| 2012/0218784 A1* | 8/2012 | Duvnjak .................. 363/21.1 |
| 2012/0218785 A1* | 8/2012 | Li ..................... H02M 1/34 363/21.12 |
| 2012/0236603 A1* | 9/2012 | Chen et al. .............. 363/21.1 |

* cited by examiner

SYSTEM AND METHOD TO AVOID REVERSE RECOVERY IN A POWER CONVERTER

BACKGROUND

The invention generally relates to power conversion systems, and more particularly, to a power conversion system using pulse width modulation.

Power converters are employed to convert one form of power to another form of power such as AC-DC or DC-AC. The power converters that convert DC power to AC power use different techniques to convert DC power to AC power. One such technique that is used to convert DC power to AC power includes pulse width modulation. Switches in the power converters are switched in a particular manner based on the pulse width modulation technique to convert the DC power to AC power. Some of the switches that are used to convert the DC power to AC power include metal-oxide-semiconductor field-effect transistors or MOSFETs and insulated-gate bipolar transistors or IGBTs, for example. In these, MOSFETS are preferred over IGBTs in the low and medium power level applications due to a better switching performance. However, the use of MOSFETS leads to reverse recovery in body diodes of the MOSFETS resulting in low conversion efficiency and electromagnetic interferences.

Hence, there is a need for an improved system to address the aforementioned issues.

BRIEF DESCRIPTION

Briefly, in accordance with one embodiment, a power converter is provided. The power converter includes a converter leg including switches for converting power. The power converter also includes a controller for switching the switches using a pulse width modulation technique. The power converter further includes an interface inductor coupled to the converter leg for avoiding a reverse recovery of current in the switches during operation.

In another embodiment, a power generation system is provided. The power generation system includes a DC power source for generating DC power. The power generation system also includes a DC-AC converter coupled to the DC power source. The power generation system further includes a converter leg comprising switches for converting the DC power received from the DC power source to an AC power. The power generation system also includes a controller for switching the switches using a pulse width modulation technique for converting the DC power to the AC power. The power generation system further includes an interface inductor coupled to the converter leg for avoiding a reverse recovery of current in the switches during operation. The power generation system also includes a main inductor coupled to the interface inductor for processing the AC power. The power generation system further includes a LC filter for filtering a switching ripple generated by the DC-AC converter.

In yet another embodiment, a method for avoiding reverse recovery of current is provided. The method includes receiving DC power from a DC power source. The method also converting the DC power to an AC power based on a pulse width modulation technique. The method further includes avoiding a reverse recovery of current using interface inductors. The method also includes filtering a switching ripple using an LC filter.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

Embodiments of the present invention include a power converter that comprises a converter leg. The converter leg includes switches for converting power. The power converter also includes a controller that switches the switches using a pulse width modulation technique. The converter leg is coupled to an interface inductor that reduces a circulation current in the converter leg and avoids a reverse recovery of current in the switches during operation.

Figure 1:
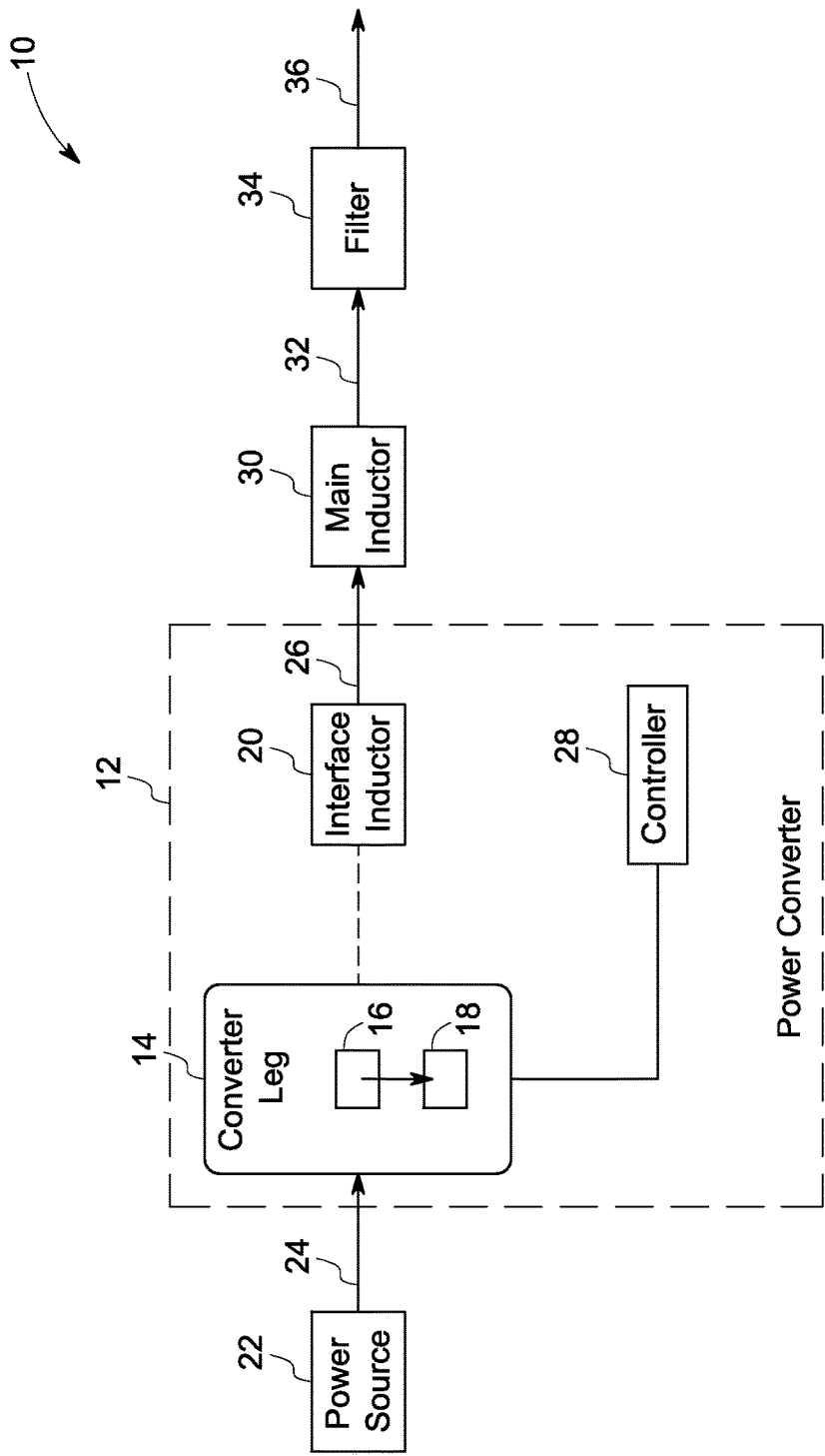
FIG. 1 is a block diagram representation of a power generation system including a power converter that comprises a converter leg wherein the converter leg includes switches and the converter leg is coupled to an interface inductor in accordance with an embodiment of the invention.

FIG. 1 is a block diagram representation of a power generation system 10 that includes a power converter 12 wherein the power converter 12 comprises a converter leg 14 and the converter leg 14 comprises switches 16, 18 wherein the converter leg 14 is coupled to an interface inductor 20 in accordance with an embodiment of the invention. The power generation system 10 includes a power source 22 for providing an input power 24 to the power converter 12 that converts the input power 24 to an output power 26. The power converter 12 includes the converter leg 14 and a controller 28 coupled to the converter leg 12 that controls the switching of the switches 16, 18 during the conversion of the input power 24 to the output power 26. In a specific embodiment, the switches 16, 18 include MOSFETS. The switches 16, 18 are switched using a pulse width modulation technique by the controller 28 to convert the input power 24 to the output power 26. During switching of the switches 16 and 18, the switching cycle includes a freewheeling time period wherein an output current of the output power flows through the body diodes of the switch 16 or 18 depending on the current direction. When the switch 18 or 16 is turned on again the body diode of switch 16 or 18 keeps conducting until the charge stored in the body diode is depleted (a phenomena called reverse recovery of diode where the diode does not attain its blocking capability), resulting in a current spike (shoot through current) flowing through the converter leg in a short period of time. The reverse recovery current results in power losses and severe electromagnetic interference during switching of the switches 16 and 18. Therefore, the converter leg 12 is coupled to an interface inductor 20 that diverts the output current from the body diode to a fast recovery diode or Schottky diode leading to a significant reduction or elimination of reverse recovery condition in the switches 16 and 18. The interface inductor 20 is connected to a main inductor 30 that processes the output power 26 received from the power converter 12 and transmits the processed power 32 to a filter 34 that is coupled to the main inductor 30 for filtering a switching ripple generated in the output power 26 during switching. The power generation system 10 is coupled to a load 46 (FIG. 2) wherein the power generation system 10 transmits a filtered power 36 received from the filter 34 to the load.

Figure 2:
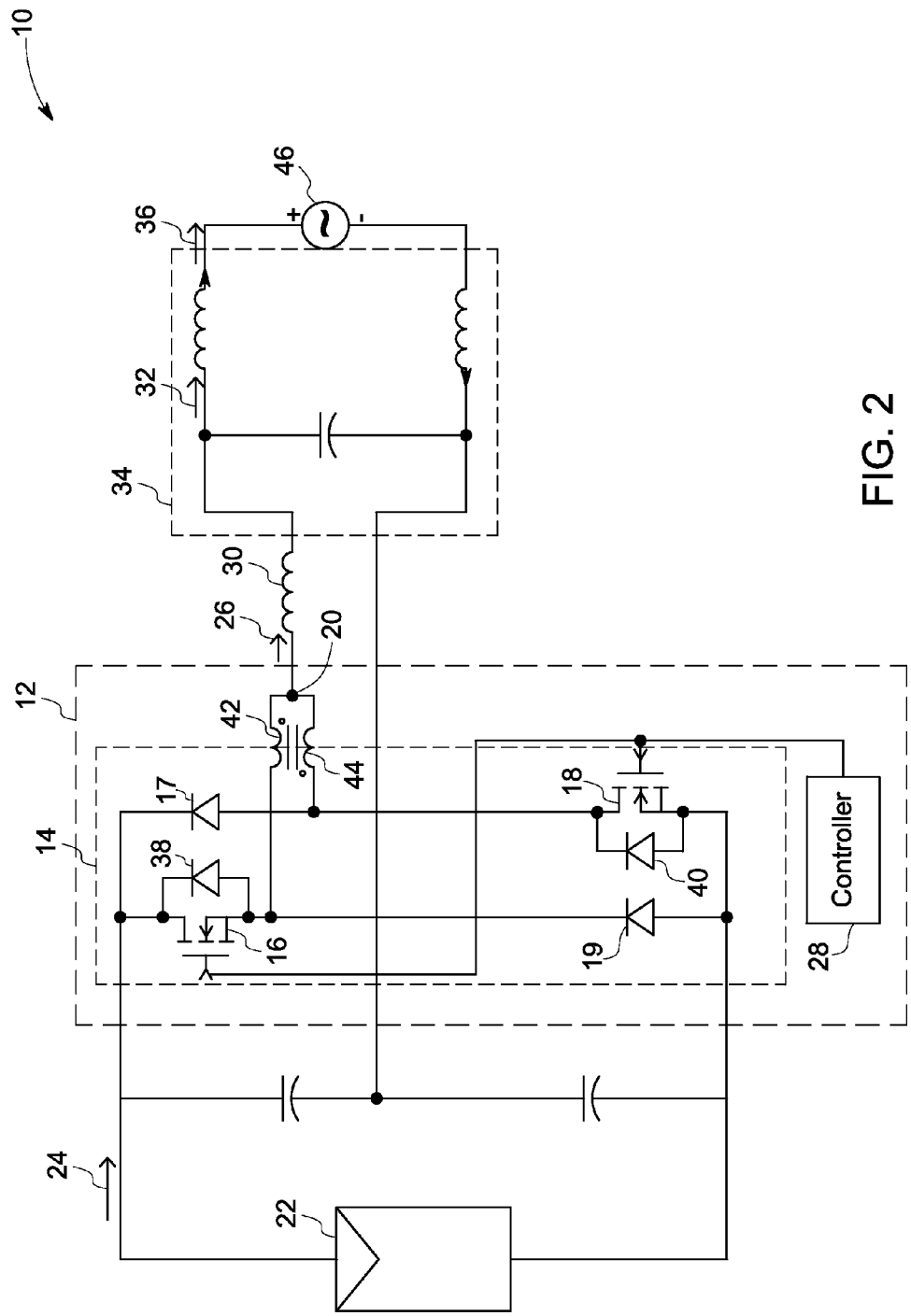
FIG. 2 is a schematic representation of an exemplary photovoltaic power generation system including a half bridge DC-AC power converter for converting DC power to AC power in accordance with an embodiment of the invention.

FIG. 2 is an equivalent schematic representation of the power generation system 10 of FIG. 1 wherein an exemplary photovoltaic power generation system 10 including a half bridge DC-AC power converter 12 for converting DC power 24 to AC power 26 is depicted in accordance with an embodiment of the invention. The photovoltaic power generation system 10 includes a photovoltaic power source 22 such as photovoltaic panels coupled to the half bridge DC-AC converter 12, hereinafter referred to as the DC-AC converter 12. The term "DC-AC converter" is used interchangeably with the term "power converter" of FIG. 1. The DC-AC converter 12 receives DC power from the photovoltaic source 22 and converts the DC power 24 to AC power 26. The DC-AC converter 12 includes the converter leg 14 which includes switches 16, 18. The converter leg 14 is coupled to the controller 28 that switches the switches 16, 18 using the pulse width modulation technique to convert the DC power 24 to AC power 26. In one embodiment, the controller 28 may use one of a traditional pulse width modulation technique, an improved pulse width modulation technique and a hybrid pulse width modulation technique to convert DC power 24 to AC power 26. In another embodiment, the pulse width modulation technique may include a unipolar or a bipolar pulse width modulation technique. The converter leg 14 is also coupled to the interface inductor 20. Moreover, the converter leg 14 may also include fast recovery diodes 17 and 19 respectively coupled in series with switches 18 and 16. During operation, the interface inductor 20 in conjunction with the fast recovery diodes 17 and 19 eliminates reverse recovery of current in the body diodes 38, 40 of the respective switches 16, 18. In one embodiment, the interface inductor 20 comprises coupled or uncoupled inductors. In a specific embodiment, the interface inductor 20 includes two inductors 42, 44 coupled to each other. In another embodiment, the interface inductor 20 includes a power rating of less than or equal to ten percent of a power rating of the main inductor 30. The AC power 26 at an output of the DC-AC converter 12 is transmitted to the main inductor 30 that processes the AC power 26 and transmits the processed AC power 32 to the filter 34. In one embodiment, the filter 34 includes an LC filter. The filter 34 is used to filter out any switching ripple in the processed AC power 32 which may have been developed in the AC power 26 during switching. The filter 34 transmits the filtered power 36 to the load 46.

Figure 3:
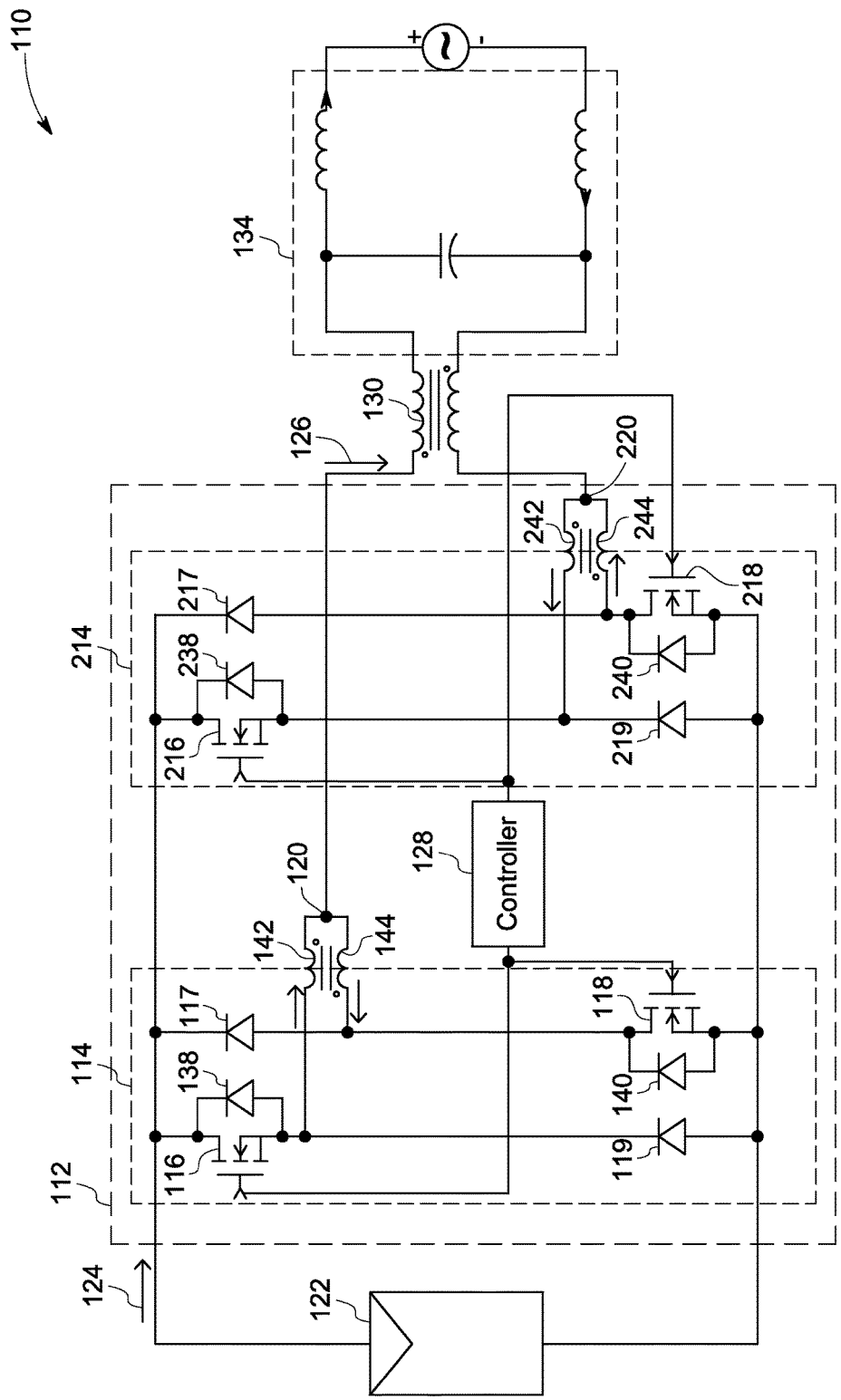
FIG. 3 is a schematic representation of an exemplary photovoltaic power generation system including a full bridge DC-AC converter for converting DC power to AC power and one main inductor for processing the AC power in accordance with an embodiment of the invention.

FIG. 3 is a schematic representation of an exemplary photovoltaic power generation system 110 including a full bridge DC-AC converter 112 for converting DC power 124 to AC power 126 and one main inductor 130 for processing the AC power 126 in accordance with an embodiment of the invention. In one embodiment, the full bridge DC-AC converter 112 includes a first converter leg 114 and a second converter leg 214 and the first converter leg 114 comprises two switches 116, 118 and the second converter leg 214 comprises two switches 216, 218. In another embodiment, the interface inductor comprises a first interface inductor 120 and a second interface inductor 220 wherein the first interface inductor 120 is coupled to the first converter leg 114 and the second interface inductor 220 is coupled to the second converter leg 214. In a more specific embodiment, the first interface inductor 120 comprises two inductors 142 and 144 coupled to each other with reverse polarity and the second interface inductor 214 comprises two inductors 242 and 244 coupled to each other with reverse polarity. For understanding purposes, the operation of the full bridge DC-AC converter 112 is discussed with respect to the traditional bipolar pulse width modulation, however, the controller 128 may use any technique for switching of the switches 116, 118, 216, 218 and may modify the switching pattern of the switches based on the used technique.

During switching operation, initially the controller 128 switches the switches 116 and 218 to a conducting state and switches 118 and 216 to a non-conducting state for a first time interval and switches the switches 118 and 216 to a conduction state and switches 116 and 218 to a non-conduction state in a second time interval.

In the first time interval, an inductor current ($I_L$) in the main inductor 130 increases at a rate of (DC voltage−|AC voltage|)/L wherein DC voltage 124 is the input voltage 24 (FIG. 1) to the full bridge DC-AC converter 112 and AC voltage 134 is the voltage 32 (FIG. 1) of the full bridge DC-AC converter 112 and L is the inductance of the main inductor 130. The inductor current ($I_L$) flows through the switches 116 and 218 in the first time interval.

Subsequently, in the second time interval, the inductor current ($I_L$) in the main inductor decreases at a rate of (DC voltage+|AC voltage|)/L when the switches 116 and 218 are switched to a non-conducting state. The duration for which the inductor current ($I_L$) decreases is known as the freewheeling time and during this freewheeling-time, the inductor current ($I_L$) flows through diodes 119 and 217 which is referred to as the freewheeling current ($I_{fw}$). The interface inductors 120 and 220 during the freewheeling-time develop a voltage across themselves that prevents the freewheeling current ($I_{fw}$) to flow through the body diodes 140 and 238 of the switches 118 and 216 respectively and avoids the reverse recovery of current in switches 118 and 216.

Furthermore, during the second time interval, the switches 118 and 216 are switched to a conducting state to ensure continued conduction mode of the main inductor 130.

Figure 4:
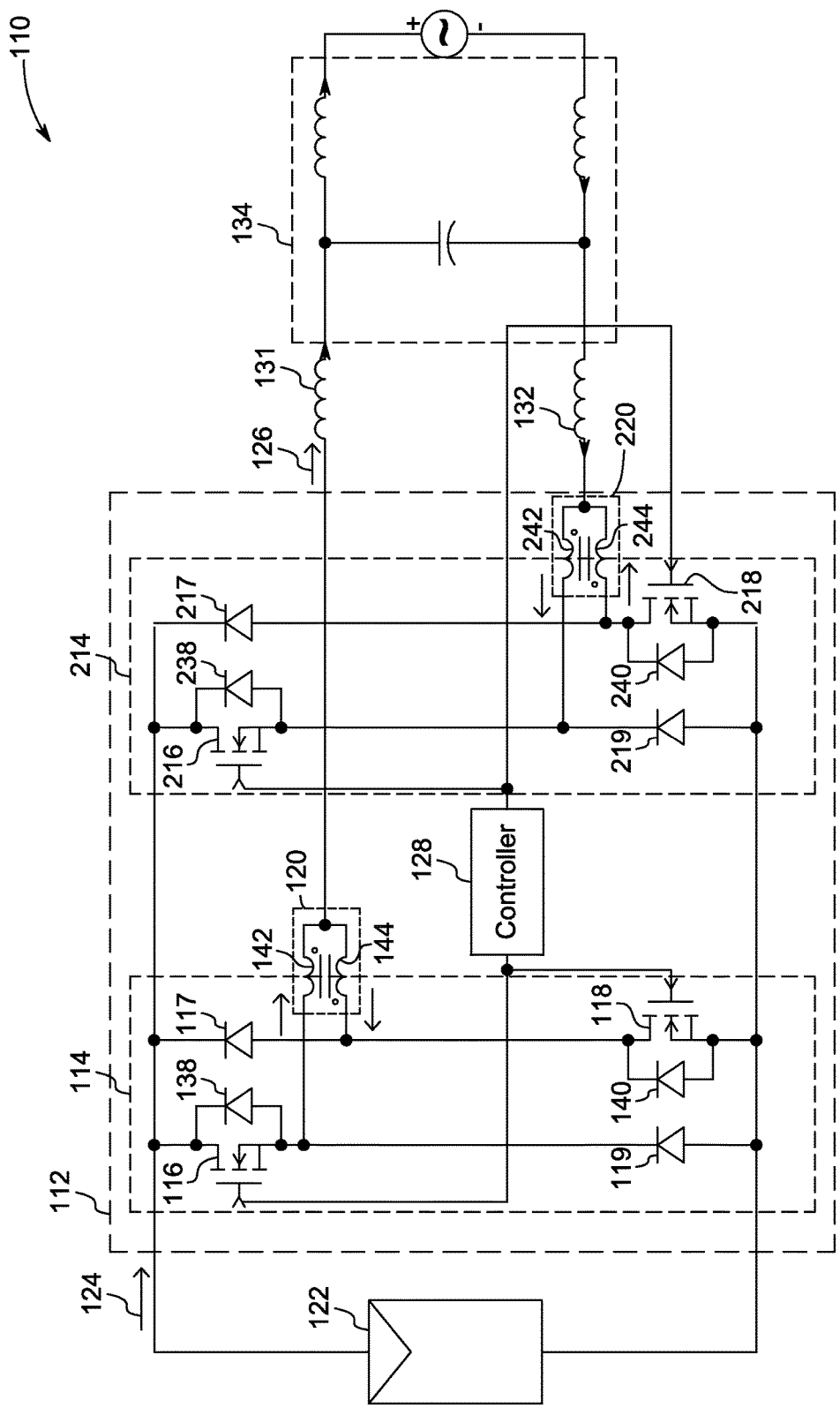
FIG. 4 is a schematic representation of an alternative embodiment of an exemplary photovoltaic power generation system including a DC-AC power converter for converting DC power to AC power and two main inductors for processing the AC power in accordance with an embodiment of the invention.

FIG. 4 is a schematic representation of an alternative embodiment of the exemplary photovoltaic power generation system 110 including the full bridge DC-AC converter 112 for converting DC power 124 to AC power 126 and two main inductors 131 and 132 for processing the AC power 126 in accordance with an embodiment of the invention. In the particular embodiment, the main inductor 130 comprises two main inductors 131 and 132 connected to the filter 134. The two main inductors 131, 132 operate as a main power processing inductor and process the AC power 126 accordingly.

Figure 5:
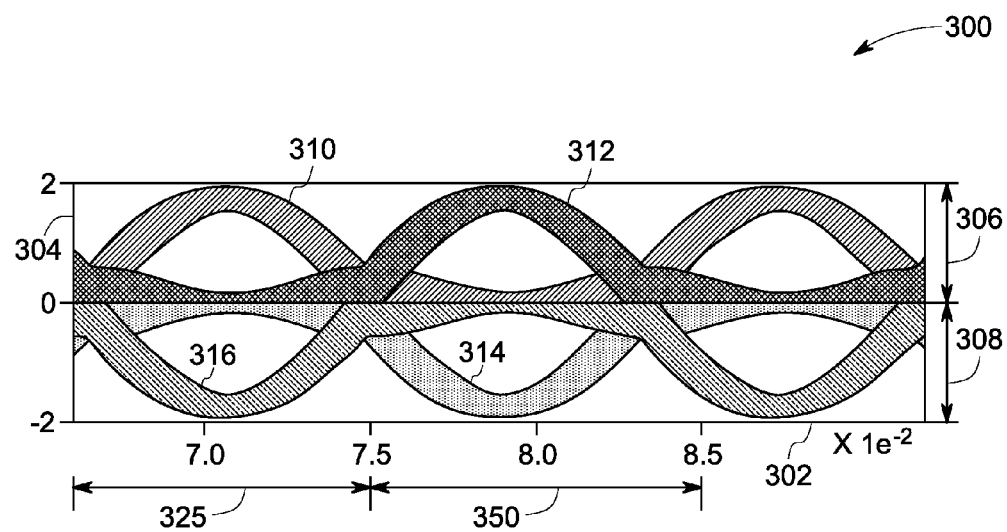
FIG. 5 is an exemplary graphical representation of current waveforms at a first interface inductor and a second interface inductor coupled to a first converter leg and a second converter leg of a full bridge DC-AC converter in accordance with an embodiment of the invention.

FIG. 5 is an exemplary graphical representation 300 of current waveforms at the first interface inductor and the second interface inductor coupled to the first converter leg and the second converter leg of a full bridge DC-AC converter in accordance with an embodiment of the invention. X-axis 302 represents time in miliseconds. Y-axis 304 represents current in amperes. The graph 300 is divided into two planes 306 and 308 representing a positive plane and a negative plane in the graph respectively. Waveform 310 represents the current across the inductor 142 (FIG. 3) of the first interface inductor 120 (FIG. 3). Waveform 312 represents the current across the inductor 144 (FIG. 3) of the first interface inductor 120 (FIG. 3). Waveform 314 represents the current across the inductor 242 (FIG. 3) of the second interface inductor 220 (FIG. 3) and waveform 316 represents the current across the inductor 244 (FIG. 3) of the second interface inductor 220.

In the first half line cycle represented by reference numeral 325, switches 116 (FIG. 3) and 218 (FIG. 3) are in an active mode that controls power flow to the output and current flows through the inductor 142 and inductor 244 of the first interface inductor 120 and the second interface inductor 220 respectively. The current flowing through inductor 142 is represented by waveform 310 in the positive plane 306 and since the current further flows through the main inductor 131 (FIG. 4) and main inductor 132 (FIG. 4), the direction of the flow of current entering the inductor 244 is opposite to the polarity of inductor 244 and thus the current flowing through the inductor 244 in the first duty cycle is represented in the negative plane 308 by waveform 316. As can be seen from waveforms 310 and 316, the currents in inductors 142 and 244 do not cross their respective planes during or after the first half line cycle as a voltage is induced in the respective interface inductors 120 and 220 due to the coupling effect of the inductors 142, 144 and 242, 244 in the first interface inductor and the second interface inductor respectively. The voltage at the interface inductors 120 and 220 prevent the current to flow through the body diodes 140 and 238 of the switches 118 and 216 in the first half line cycle, the switches 116 and 218 switch to the conducting state without any reverse recovery of current as can be seen clearly from the waveforms 312 and 314 of the inductors 144 and 242.

Similarly, in the second half line cycle represented by reference numeral 350, switches 118 (FIG. 3) and 216 (FIG. 3) are in an active mode that controls power flow to the output. The current in the second half line cycle flows through inductor 144, through switches 118 and 216 and further through inductor 242 in a direction opposite to the polarity of inductor 242. Therefore, waveform 312 represents the current through inductor 144 in the positive plane 306 during the second half line cycle and waveform 314 represents the current through inductor 242 in the negative plane 208 during the second half line cycle. As can be seen from waveforms 312 and 314, the currents in inductors 144 and 242 do not cross their respective planes during or after the second half line cycle as a voltage is induced in the respective interface inductors 120 and 220 due to the coupling effect of the inductors 142, 144 and 242, 244 in the first interface inductor and the second interface inductor respectively. The voltage induced in the interface inductors 120 and 220 avoids the flow of current in the body diodes 138 and 240 of the switches 116 and 218 and prevents reverse recovery of current during a switching event.

Figure 6:
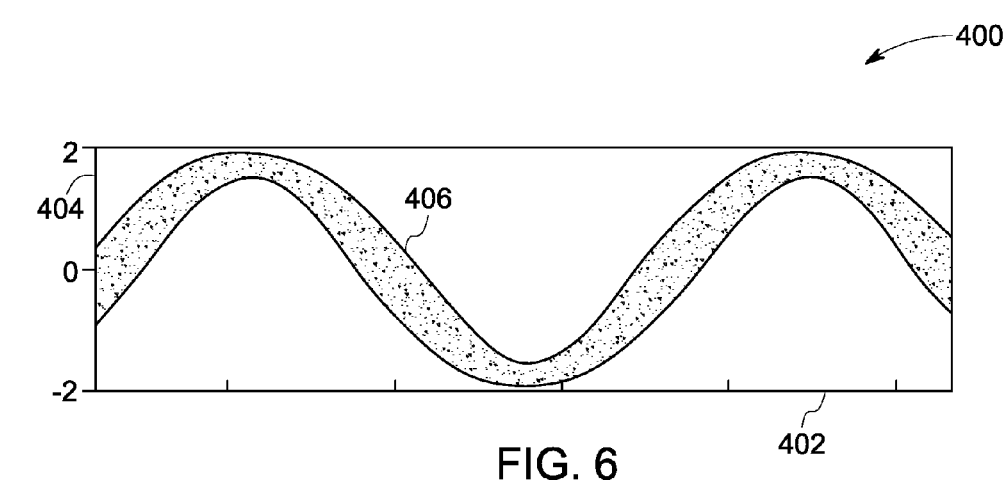
FIG. 6 is an exemplary graphical representation of current across the main inductor of the photovoltaic power generation system in accordance with an embodiment of the invention.

FIG. 6 is an exemplary graphical representation 400 of current across the main inductor of the photovoltaic power generation system 110 (FIG. 3) in accordance with an embodiment of the invention. X-axis 402 represents time in miliseconds. Y-axis 404 represents current in amperes. Waveform 406 represents current in the main inductor 130 during operation of the DC-AC converter 112. As can be seen, the current across the main inductor 130 is similar to the current that is provided at the load as depicted in FIG. 7.

Figure 7:
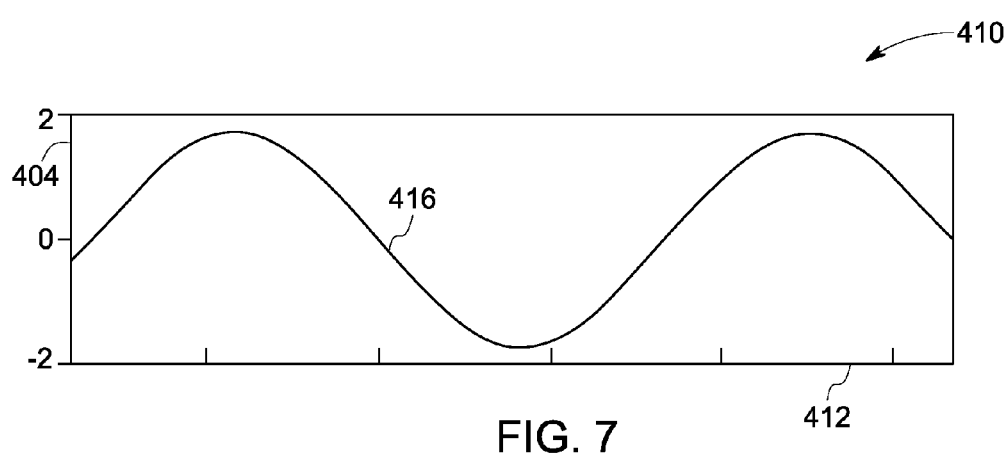
FIG. 7 is a graphical representation of current provided at a load of a photovoltaic power generation system in accordance with an embodiment of the invention.

Referring to FIG. 7, a graphical representation 410 of current to the grid provided at the output of the photovoltaic power generation system 110 (FIG. 3) in accordance with an embodiment of the invention is shown. X-axis 412 represents time in miliseconds and Y-axis 414 represents current in amperes. Waveform 416 represents the output current at the load 46 (FIG. 2) of the DC-AC power generation system. Clearly, the waveforms 406 and 416 are similar except that the high frequency switching ripple is filtered out.

Figure 8:
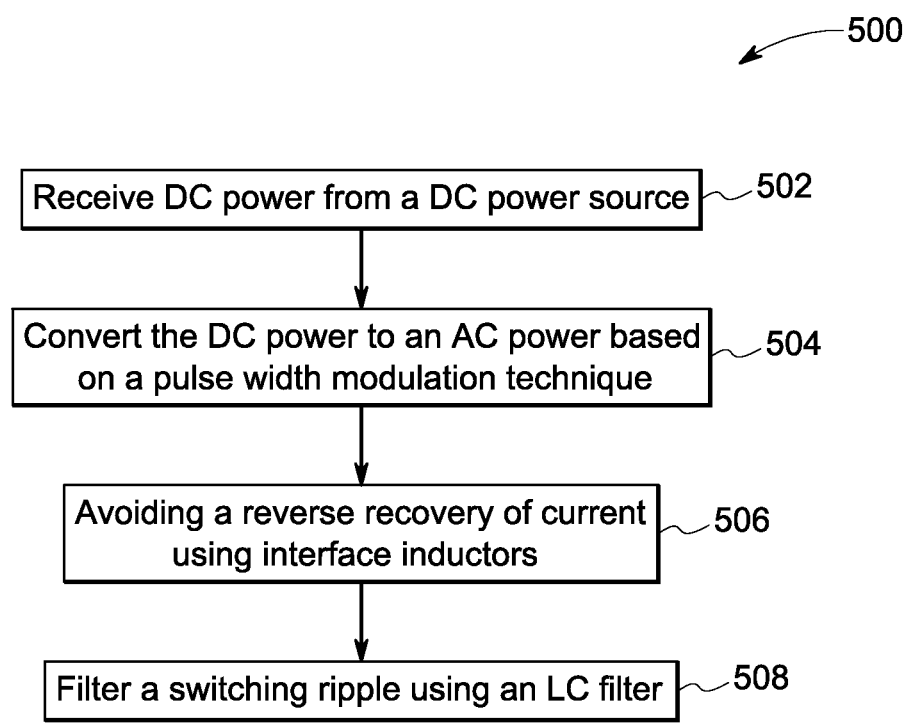
FIG. 8 is a flow chart representing steps involved in a method for converting DC power to AC power and avoiding a reverse recovery of current during operation in accordance with an embodiment of the invention.

FIG. 8 is a flowchart representing steps involved in a method 500 for converting DC power to AC power and avoiding a reverse recovery of current during operation in accordance with an embodiment of the invention. The method 500 includes receiving DC power from a DC power source in step 502. The method 500 also includes converting the DC power to an AC power based on a pulse width modulation technique in step 504. The method 500 further includes avoiding a reverse recovery of current using interface inductors in step 506. The method also includes filtering a switching ripple using an LC filter in step 508.

It is to be understood that a skilled artisan will recognize the interchangeability of various features from different embodiments and that the various features described, as well as other known equivalents for each feature, may be mixed and matched by one of ordinary skill in this art to construct additional systems and techniques in accordance with principles of this disclosure. It is, therefore, to be understood that the appended claims are intended to cover all such modifications and changes as fall within the true spirit of the invention.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A DC-AC power converter, comprising:
   a converter leg comprising a first switch and a second switch for converting power, wherein each of the first switch and the second switch comprises a drain terminal, a gate terminal, and a source terminal, and wherein the drain terminal of the first switch is coupled to a first terminal of a power source, and the source terminal of the second switch is coupled to a second terminal of the power source;
   a first fast recovery diode coupled in series with the first switch such that a cathode terminal of the first fast recovery diode is coupled to the source terminal of the first switch and an anode terminal of the first fast recovery diode is coupled to the source terminal of the second switch;

a second fast recovery diode coupled in series with the second switch such that a cathode terminal of the second fast recovery diode is coupled to the drain terminal of the first switch and an anode terminal of the second fast recovery diode is coupled to the drain terminal of the second switch;

a controller for switching the first switch and the second switch using a pulse width modulation technique; and an interface inductor comprising a first inductor and a second inductor electrically coupled to each other with reverse polarity, wherein a first terminal of the first inductor is directly connected to the source terminal of the first switch and the cathode terminal of the first fast recovery diode, and a first terminal of the second inductor is directly connected to the drain terminal of the second switch and the anode terminal of the second fast recovery diode, wherein a second terminal of the first inductor is directly connected to a second terminal of the second inductor, and wherein, during operation, the interface inductor is configured to divert a current to the first fast recovery diode or the second fast recovery diode to avoid a reverse recovery of the current in the first switch or the second switch.

2. The power converter of claim 1, wherein the converter leg comprises two converter legs and each converter leg comprises two switches.

3. The power converter of claim 1, further comprising a main inductor electrically coupled to the interface inductor for processing a converted power received from the converter leg.

4. The power converter of claim 3, further comprising a filter electrically coupled to the main inductor.

5. The power converter of claim 4, wherein the filter comprises a LC filter.

6. The power converter of claim 3, wherein the main inductor comprises a pair of main inductors electrically coupled in series to each other.

7. The power converter of claim 1, wherein the interface inductor comprises a power rating of less than or equal to about ten percent of a power rating of the main inductor.

8. The power converter of claim 1, wherein the first and second switches comprise metal oxide semiconductor field effect transistor switches (MOSFETS).

9. A power generation system, comprising:
a DC power source for generating DC power;
a DC-AC converter electrically coupled to the DC power source and comprising:
a converter leg comprising a first switch and a second switch for converting the DC power received from the DC power source to an AC power, wherein each of the first switch and the second switch comprises a drain terminal, a gate terminal, and a source terminal, and wherein the drain terminal of the first switch is coupled to a first terminal of a power source, and the source terminal of the second switch is coupled to a second terminal of the power source;
a controller for switching the first switch and the second switch using a pulse width modulation technique for converting the DC power to the AC power;
a first fast recovery diode coupled in series with the first switch such that a cathode terminal of the first fast recovery diode is coupled to the source terminal of the first switch and an anode terminal of the first fast recovery diode is coupled to the source terminal of the second switch;

a second fast recovery diode coupled in series with the second switch such that a cathode terminal of the second fast recovery diode is coupled to the drain terminal of the first switch and an anode terminal of the second fast recovery diode is coupled to the drain terminal of the second switch;

an interface inductor comprising a first inductor and a second inductor electrically coupled to each other with reverse polarity, wherein a first terminal of the first inductor is directly connected to the source terminal of the first switch and the cathode terminal of the first fast recovery diode, and a first terminal of the second inductor is directly connected to the drain terminal of the second switch and the anode terminal of the second fast recovery diode, wherein a second terminal of the first inductor is directly connected to a second terminal of the second inductor, and wherein, during operation, the interface inductor is configured to divert a current to the first fast recovery diode or the second fast recovery diode to avoid a reverse recovery of the current in the first switch or the second switch;

a main inductor coupled to the interface inductor for processing the AC power; and a LC filter for filtering a switching ripple generated by the DC-AC converter.

10. The power generation system of claim 9, wherein the first and second switches comprise metal oxide semiconductor field effect transistor switches.

11. The power generation system of claim 9, wherein the converter leg comprises two converter legs and each converter leg comprises two switches.

12. The power generation system of claim 9, wherein the interface inductor comprises coupled inductors.

13. The power generation system of claim 9, wherein the main inductor comprises a pair of main inductors in series.

14. The power generation system of claim 9, wherein the interface inductor comprises a power rating of less than or equal to about ten percent of a power rating of the main inductor.

15. A method, comprising:
receiving DC power from a DC power source;
converting the DC power to an AC power by switching a first switch and a second switch of a converter leg based on a pulse width modulation technique, wherein each of the first switch and the second switch comprises a drain terminal, a gate terminal, and a source terminal, and wherein the drain terminal of the first switch is coupled to a first terminal of a power source, and the source terminal of the second switch is coupled to a second terminal of the power source;
developing a voltage across two inductors of an interface inductor;
diverting the current to a first fast recovery diode or a second fast recovery diode to avoid a reverse recovery of the current in the first switch or the second switch, wherein the first fast recovery diode is coupled in series with the first switch such that a cathode terminal of the first fast recovery diode is coupled to the source terminal of the first switch and an anode terminal of the first fast recovery diode is coupled to the source terminal of the second switch, wherein the second fast recovery diode is coupled in series with the second switch such that a cathode terminal of the second fast recovery diode is coupled to the drain terminal of the first switch and an anode terminal of the second fast recovery diode is coupled to the drain terminal of the second switch, wherein the interface inductor comprises a first inductor and a second inductor electrically coupled to each other with reverse polarity, wherein a first terminal of the first inductor is directly connected to the source terminal of the first switch and the cathode terminal of the first fast recovery diode, and a first terminal of the second inductor is directly connected to the drain terminal of the second switch and the anode terminal of the second fast recovery diode, and wherein a second terminal of the first inductor is directly connected to a second terminal of the second inductor; and filtering a switching ripple using an LC filter.

* * * * *